United States Patent
Tadayon et al.

(10) Patent No.: US 12,498,275 B2
(45) Date of Patent: Dec. 16, 2025

(54) TEMPERATURE MEASUREMENT USING FABRY-PÃƒâ€°ROT RESONATOR ON END OF OPTICAL FIBER

(71) Applicant: Fluke Corporation, Everett, WA (US)

(72) Inventors: Mohammad Amin Tadayon, Gaithersburg, MD (US); Robert B. Haines, Phoenix, AZ (US)

(73) Assignee: Fluke Corporation, Everett, WA (US)

( * ) Notice: Subject to any disclaimer, the term of this patent is extended or adjusted under 35 U.S.C. 154(b) by 410 days.

(21) Appl. No.: 18/162,561

(22) Filed: Jan. 31, 2023

(65) Prior Publication Data

US 2024/0255360 A1    Aug. 1, 2024

(51) Int. Cl.
*G01K 11/3206*    (2021.01)

(52) U.S. Cl.
CPC ................................ *G01K 11/3206* (2013.01)

(58) Field of Classification Search
CPC .................................................. G01K 11/3206
See application file for complete search history.

(56) References Cited

U.S. PATENT DOCUMENTS

| | | | |
|---|---|---|---|
| 6,839,496 B1 | 1/2005 | Mills et al. | |
| 9,726,553 B2 | 8/2017 | Ahmed et al. | |
| 10,955,617 B2 | 3/2021 | Klimov et al. | |
| 2011/0211199 A1* | 9/2011 | Karrai et al. | G01B 11/02 256/508 |
| 2015/0033848 A1* | 2/2015 | Pechstedt | G01D 5/35306 73/497 |
| 2018/0028117 A1 | 2/2018 | Desjardins et al. | |
| 2019/0025122 A1* | 1/2019 | Nayak et al. | G01J 3/26 |
| 2019/0319733 A1 | 10/2019 | Lipson et al. | |

(Continued)

OTHER PUBLICATIONS

Chen et al, "High-Temperature Sensor Based on Fabry-Perot interferometer in Microfiber Tip", Sensors, 2018, 18, 202, pp. 1-7 (Year: 2018).*

(Continued)

*Primary Examiner* — John E Breene
(74) *Attorney, Agent, or Firm* — Seed Intellectual Property Law Group LLP

(57) ABSTRACT

A temperature measurement device includes a Fabry-Pérot resonator constructed of an inorganic optical material on an end of an optical fiber. Light in the optical fiber couples into a cavity of the Fabry-Pérot resonator and resonates at a resonance that varies with temperature of the Fabry-Pérot resonator. A detector receives output light from the Fabry-Pérot resonator and produces a signal indicating a detected resonance. Computing circuitry receives the signal, determines a temperature of the Fabry-Pérot resonator based on the detected resonance and a relationship that correlates the detected resonance with the temperature of the Fabry-Pérot resonator, and outputs a temperature measurement. The cavity may include a channel comprised of a material having a different refractive index than surrounding material. The temperature measurement device may include multiple Fabry-Pérot resonators. The inorganic optical material enables the temperature measurement device to output a temperature measurement that extends to at least 900° C.

20 Claims, 6 Drawing Sheets

(56) References Cited

U.S. PATENT DOCUMENTS

| | | |
|---|---|---|
| 2021/0018431 A1* | 1/2021 | Viegas et al. ........ G01N 21/255 |
| 2021/0381906 A1 | 12/2021 | Tadayon et al. |
| 2021/0381908 A1 | 12/2021 | Tadayon et al. |
| 2021/0382254 A1 | 12/2021 | Lipson et al. |
| 2022/0291056 A1 | 9/2022 | Tadayon |

OTHER PUBLICATIONS

Yu et al, "Hybrid Sapphire Dual-Fabry-Perot Cavities Sensor for High Temperature and Refractive Index Measurement", Journal of Lightwave Technology, vol. 39, No. 12, Jun. 15, 2021, pp. 3911-3918 (Year: 2021).*

Mathew et al, "In-Fiber Fabry-Perot Cavity Sensor for High-Temperature Applications", Journal of Lightwave Technology, vol. 33, No. 12, Jun. 15, 2015, pp. 2419-2455 (Year: 2015).*

Wang et al, "A High Temperature Sensor Based on Sapphire Fiber Fabry-Perot Interferometer", IEEE Photonics Technology Letters, vol. 32, No. 2, Jan. 15, 2020, pp. 89-92 (Year: 2020).*

Tadayon M.A. et al., "Polymer Waveguide Fabry-Perot Resonator for High-Frequency Ultrasound Detection", IEEE Transactions on Ultrasonics, Ferroelectrics, and Frequency Control, vol. 61, No. 12, Dec. 2014, 7 pages.

Tadayon M.A. et al., "High quality factor polymeric Fabry-Perot resonators utilizing a polymer waveguide", Optics Express, Mar. 2014, 10 pages.

Ding W. et al., "High-temperature fiber-optic Fabry-Perot interferometric sensors", Review of Scientific Instruments 86, 055001, 2015, 4 pages.

Thathachary S.V., "Polymer Waveguides for Improved Sensitivity in Fiber Fabry-Perot Ultrasound Detectors", IEEE Sensors Journal, vol. 21, No. 1, Jan. 1, 2021, 8 pages.

* cited by examiner

TEMPERATURE MEASUREMENT USING FABRY-PÉROT RESONATOR ON END OF OPTICAL FIBER

BACKGROUND

Technical Field

The present disclosure relates to temperature measurement, and in particular, to temperature measurement devices, systems, and methods that measure a temperature based on a resonance of light in an optical resonator.

Description of the Related Art

Temperature measurement is an important part of many technological processes, for example, in operating industrial equipment, conducting manufacturing process control, monitoring environmental conditions, etc. Cost, stability, and accuracy are major considerations in thermometry. Resistance thermometers that use measurements of resistance of a thin metal film or wire, e.g., platinum resistance thermometers, are known and can produce accurate temperature measurements. However, resistance thermometers are typically sensitive to environmental variables such as humidity, material degradation, and mechanical shock, which causes the resistance relative to temperature to drift over time, requiring frequent, expensive, and time-consuming calibration. Resistance thermometers are also limited in the range of temperatures that they can measure and cannot measure higher temperatures exceeding an upper threshold.

Photonic thermometry is an alternative to resistance thermometry. Photonic thermometers rely on temperature-dependent changes in an optical material, typically a combination of thermo-optic effects and thermal expansion, which cause detectable changes in light traversing the optical material. Photonic thermometers constructed on a silicon substrate can provide high temperature sensitivity while being less susceptible to environmental variables, as noted above for resistance thermometers, but photonic thermometers constructed on silicon are also limited in the range of temperatures that they can measure.

BRIEF SUMMARY

Aspects of the present disclosure provide temperature measurement devices, systems, and methods that can accurately measure temperatures across a wide range of temperatures, including higher temperatures at which conventional thermometers fail.

In various embodiments, the present disclosure provides a temperature measurement device that uses a Fabry-Pérot resonator constructed of an inorganic optical material arranged on an end of an optical fiber. Input light that scans across a range of wavelengths is injected into the optical fiber. A portion of the light transmitted by the optical fiber is coupled into the Fabry-Pérot resonator and resonates in a cavity between end mirrors of the Fabry-Pérot resonator. The light in the cavity resonates at a resonance (i.e., a resonant wavelength or frequency) that varies (i.e., shifts) according to the temperature of the Fabry-Pérot resonator, due to thermos-optic effects of the temperature on the material of the resonator. A detector receives output light from the Fabry-Pérot resonator and produces a signal indicating a detected resonance of the light in the Fabry-Pérot resonator. Computing circuitry determines the temperature of the Fabry-Pérot resonator based on the detected resonance and a predetermined relationship that correlates the detected resonance with the temperature of the Fabry-Pérot resonator. The predetermined relationship may be represented by a characteristic curve that is expressed, for example, by a numeric equation or by a data structure such as a lookup table.

In various embodiments, the Fabry-Pérot resonator may be constructed directly on the end of an optical fiber using multilayer deposition techniques. Because the Fabry-Pérot resonator is made of inorganic optical material, the temperature measurement device can measure temperatures that exceed an upper threshold (e.g., above 600° C.) at which conventional thermometers fail.

In various embodiments, the cavity of the Fabry-Pérot resonator may include a channel of material having a different refractive index than material in the cavity surrounding the channel. The channel provides a waveguide for light that is coupled into the cavity of the Fabry-Pérot resonator. This channel, or waveguide, may be constructed using two materials in the cavity of the Fabry-Pérot resonator, that is, one material having a first refractive index in the center of the cavity providing a "core" and another material having a different, second refractive index providing a "cladding" that surrounds the "core". An advantage of including a waveguide in a Fabry-Pérot resonator cavity is that the resonator achieves a significantly higher quality factor or sharper peak resonance. For a range of wavelengths of light that is input, the resonance of a waveguide Fabry-Pérot resonator as described herein may be 5-10 times sharper/higher quality factor than a single material Fabry-Pérot resonator. In some cases, achieving a sharper peak resonance can translate to higher accuracy temperature measurements.

In various embodiments, a temperature measurement system of the present disclosure includes a temperature measurement device as described above, wherein the Fabry-Pérot resonator is a first Fabry-Pérot resonator, and the detected resonance of the light in the cavity of the first Fabry-Pérot resonator is a first detected resonance. The temperature measurement system further includes a second Fabry-Pérot resonator, also constructed of an inorganic optical material. The second Fabry-Pérot resonator is optically coupled to the first Fabry-Pérot resonator such that output light from the first Fabry-Pérot resonator is coupled into a cavity of the second Fabry-Pérot resonator. The light in the cavity of the second Fabry-Pérot resonator resonates at a resonance that varies (i.e., shifts) according to a temperature of the second Fabry-Pérot resonator.

A detector as previously described, is configured to receive output light from the second Fabry-Pérot resonator, and the signal produced by the detector indicates at least one of the first detected resonance of the first Fabry-Pérot resonator or a second detected resonance of the second Fabry-Pérot resonator. Computing circuitry receives the signal and determines at least one of a first temperature of the first Fabry-Pérot resonator or a second temperature of the second Fabry-Pérot resonator. The first temperature of the first Fabry-Pérot resonator is determined based on the first detected resonance and a first relationship that correlates the first detected resonance with the temperature of the first Fabry-Pérot resonator. The second temperature of the second Fabry-Pérot resonator is determined based on the second detected resonance and a second relationship that correlates the second detected resonance with the second temperature of the second Fabry-Pérot resonator. The computing circuitry outputs a temperature measurement based on at least one of the first temperature of the first Fabry-Pérot resonator or the second temperature of the second Fabry-Pérot resonator.

In other embodiments, a temperature measurement system of the present disclosure includes a temperature measurement device as previously described, wherein the Fabry-Pérot resonator is a first Fabry-Pérot resonator, and the detected resonance of the first Fabry-Pérot resonator is a first detected resonance. The temperature measurement system further includes a second Fabry-Pérot resonator constructed of an inorganic optical material on the end of the optical fiber. Light in the optical fiber is coupled into both the cavity of the first Fabry-Pérot resonator and a cavity of the second Fabry-Pérot resonator. Light in the cavity of the second Fabry-Pérot resonator resonates at a resonance that varies according to the temperature of the second Fabry-Pérot resonator. The detector, as previously described, receives output light from both the first Fabry-Pérot resonator and the second Fabry-Pérot resonator, and the signal produced by the detector indicates at least one of the first detected resonance of the first Fabry-Pérot resonator or a second detected resonance of the second Fabry-Pérot resonator.

The computing circuitry receives the signal indicating at least one of the first detected resonance or the second detected resonance, and determines at least one of a first temperature of the first Fabry-Pérot resonator or a second temperature of the second Fabry-Pérot resonator. As with previous embodiments, the first temperature of the first Fabry-Pérot resonator is determined based on the first detected resonance and a first relationship that correlates the first detected resonance with the temperature of the first Fabry-Pérot resonator, and the second temperature of the second Fabry-Pérot resonator is determined based on the second detected resonance and a second relationship that correlates the second detected resonance with the second temperature of the second Fabry-Pérot resonator. The computing circuitry outputs a temperature measurement based on at least one of the first temperature of the first Fabry-Pérot resonator or the second temperature of the second Fabry-Pérot resonator.

In yet other embodiments, a temperature measurement system of the present disclosure similarly includes a temperature measurement device as previously described. The optical fiber as previously described is a first optical fiber, the Fabry-Pérot resonator is a first Fabry-Pérot resonator on the end of the first optical fiber, the detector is a first detector configured to receive the output light from the first Fabry-Pérot resonator, and the signal is a first signal from the first detector indicating a first detected resonance of the light in the first Fabry-Pérot resonator. The temperature measurement system further includes a second Fabry-Pérot resonator and a second detector. The second Fabry-Pérot resonator is constructed of an inorganic optical material on an end of a second optical fiber, wherein light in the second optical fiber is coupled into a cavity of the second Fabry-Pérot resonator. Light in the cavity of the second Fabry-Pérot resonator resonates at a resonance that varies according to the temperature of the second Fabry-Pérot resonator. The second detector receives output light from the second Fabry-Pérot resonator and produces a second signal indicating a second detected resonance of the light in the second Fabry-Pérot resonator.

The computing circuitry receives at least one of the first signal that indicates the first detected resonance or the second signal that indicates the second detected resonance. The computing circuitry determines at least one of a first temperature of the first Fabry-Pérot resonator based on the first detected resonance and a first relationship that correlates the first detected resonance with the temperature of the first Fabry-Pérot resonator, or a second temperature of the second Fabry-Pérot resonator based on the second detected resonance and a second relationship that correlates the second detected resonance with the second temperature of the second Fabry-Pérot resonator. The computing circuitry outputs a temperature measurement based on at least one of the first temperature of the first Fabry-Pérot resonator or the second temperature of the second Fabry-Pérot resonator.

Also described herein are methods for temperature measurement that employ any of the temperature measurement devices or systems described herein. By way of one example, a method for temperature measurement includes injecting light into an optical fiber from a light source that emits light over a range of wavelengths or frequencies, and detecting a resonance of light in a Fabry-Pérot resonator constructed of an inorganic optical material on an end of the optical fiber. Light in the optical fiber is coupled into a cavity of the Fabry-Pérot resonator and resonates at a resonance that varies according to a temperature of the Fabry-Pérot resonator. The method includes determining a temperature of the Fabry-Pérot resonator based on the resonance of the light in the Fabry-Pérot resonator and a relationship that correlates the resonance of the light in the Fabry-Pérot resonator with the temperature of the Fabry-Pérot resonator. The method further includes outputting a temperature measurement based on the temperature of the Fabry-Pérot resonator. A waveguide may be constructed in the cavity of the Fabry-Pérot resonator, as described herein.

DETAILED DESCRIPTION

Figure 1:
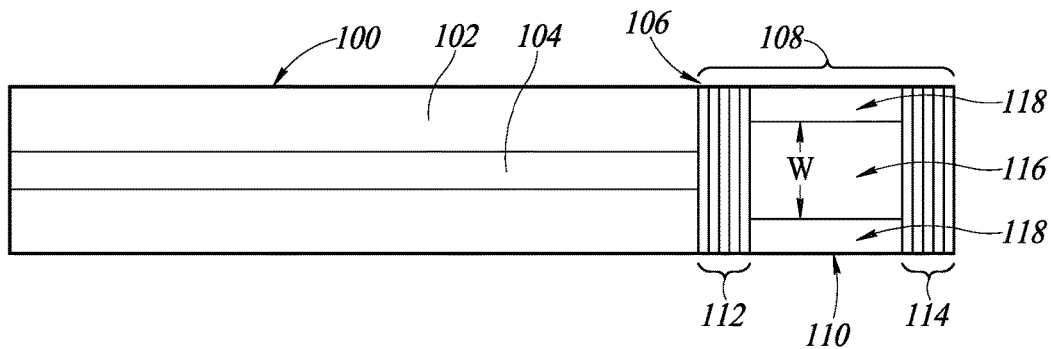
FIG. 1 illustrates a side cross-sectional schematic view of an optical fiber with a Fabry-Pérot resonator constructed on end thereof in accordance with aspects of the present disclosure.

In contrast to conventional thermometers that are limited in the range of temperatures they can measure, embodiments of the present disclosure provide a photonic temperature measurement device, system, and method that can measure temperature across a wider range of temperatures, including temperatures in a higher temperature range at which conventional thermometers fail. In particular, the present disclosure uses a Fabry-Pérot (FP) resonator constructed of an inorganic optical material on an end of an optical fiber. The inorganic optical material enables the Fabry-Pérot resonator to operate at temperatures that exceed an upper threshold at which conventional thermometers fail, thus enabling temperature measurements at higher temperatures.

As will be described herein, a portion of the light conducted by the optical fiber is coupled into a cavity of the FP resonator on the end of the optical fiber. The light in the cavity resonates at a resonance (resonant wavelength or frequency) that varies with the temperature of the FP resonator. A detector receiving output light from the FP resonator detects the resonance of the light in the FP resonator. The detector outputs a signal indicating the detected resonance to computing circuitry, which determines the temperature of the FP resonator based on the detected resonance and a relationship correlating the detected resonance with the temperature of the FP resonator.

In various embodiments, the material in the cavity of the FP resonator may include a channel of material having a different refractive index than the material in the cavity surrounding the channel. This dual material arrangement provides a waveguide for the light that is coupled into the cavity of the FP resonator. The waveguide is preferably arranged in the middle of the cavity. With a waveguide, the FP resonator is able to achieve a higher quality factor and large extinction ratio for the resonance of the light in the cavity.

Because the FP resonator is constructed of inorganic optical material on the end of an optical fiber, the temperature measurement device is able to operate in a high-temperature range, e.g., above 600° C. and even in a range of 900° C. to 2000° C. or more. Furthermore, constructing an FP resonator directly on the end of an optical fiber eliminates the need for photonic bonding to couple light from the optical fiber into the FP resonator. This reduces uncertainty in the temperature measurement, including in higher temperature applications as described. The channel of material forming a waveguide in the FP resonator cavity also provides a higher-quality resonance of the light in the cavity.

Also, as described herein, a temperature measurement system may include multiple FP resonators arranged either in parallel or in series on the end of the optical fiber. The multiple FP resonators may each be constructed with different optical properties (e.g., length of cavity, refractive index or indices of material in the cavity) so as to resonate at different resonances according to the temperature of the FP resonators. In this manner, for example, the multiple FP resonators may be arranged to individually resonate within a shorter range of input light wavelengths (or frequencies) for different ranges of temperatures, and collectively provide a temperature measurement system capable of temperature measurement across a broad range of temperatures, including temperatures in a high-temperature range.

FIG. 1 illustrates a side cross-sectional schematic view of an optical fiber 100 having Fabry-Pérot (FP) resonator 108 constructed on end thereof 106 in accordance with aspects of the present disclosure. The optical fiber 100 may include an outer cladding 102 that surrounds a central optical core 104. The optical fiber 100 may be a single mode or multimode optical fiber as is known in the art, and may be constructed of materials known for withstanding high temperature such as sapphire.

In operation, a light source injects input light into the optical fiber 100 at a first end of the optical fiber 100. The input light is communicated through the optical fiber 100 toward a second end 106, where the FP resonator 108 is constructed. The FP resonator 108 is useable to measure temperature based on a detected resonant wavelength or frequency of light resonating in a cavity 110 of the FP resonator 108. The resonance of the FP resonator 108 varies with the temperature of the FP resonator due to characteristics such as thermal expansion and thermo-optic effects that are temperature dependent.

Advantageously, the FP resonator 108 is formed of an inorganic optical material that maintains functional integrity at higher temperatures. This differs from polymer-based materials that are used in FP resonators for other applications. Examples of an inorganic optical material that may be used in various embodiments of the present disclosure include silicon nitride, titanium dioxide, and gallium arsenide, all of which are part of a class of inorganic dielectric material suitable for use at higher temperatures. In various embodiments, the inorganic optical material maintains integrity at temperatures above 600° C. In some cases, temperature measurement devices using a FP resonator as described herein are operable to measure temperatures to at least 900° C., or even higher to 2000° C.

In the example shown in FIG. 1, the FP resonator 108 includes a first reflective surface 112 and a second reflective surface 114 with a cavity (or etalon) 110 arranged therebetween. The first reflective surface 112 is constructed directly on the end 106 of the optical fiber 100. At least a portion of the light traversing the optical fiber 100 passes through the reflective surface 112 and is coupled into the cavity 110. Light may resonate within the cavity 110 between the first and second reflective surfaces 112, 114, and be output from the FP resonator 108 through either (or both) the first reflective surface 112 and/or the second reflective surface 114.

Figure 3:
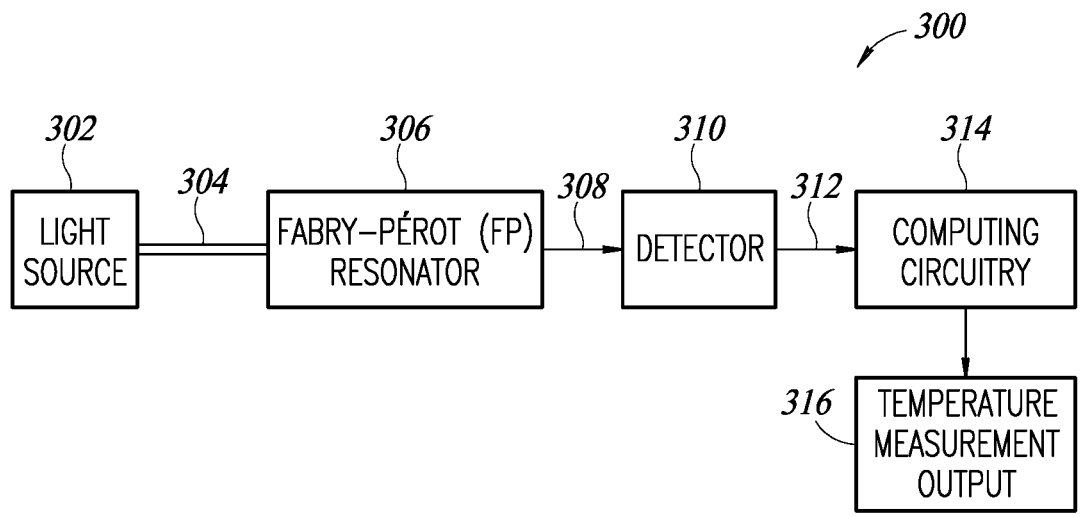
FIG. 3 is a schematic block diagram of at least one embodiment of a temperature measurement device with a single Fabry-Pérot resonator constructed in accordance with the present disclosure.
Figure 4:
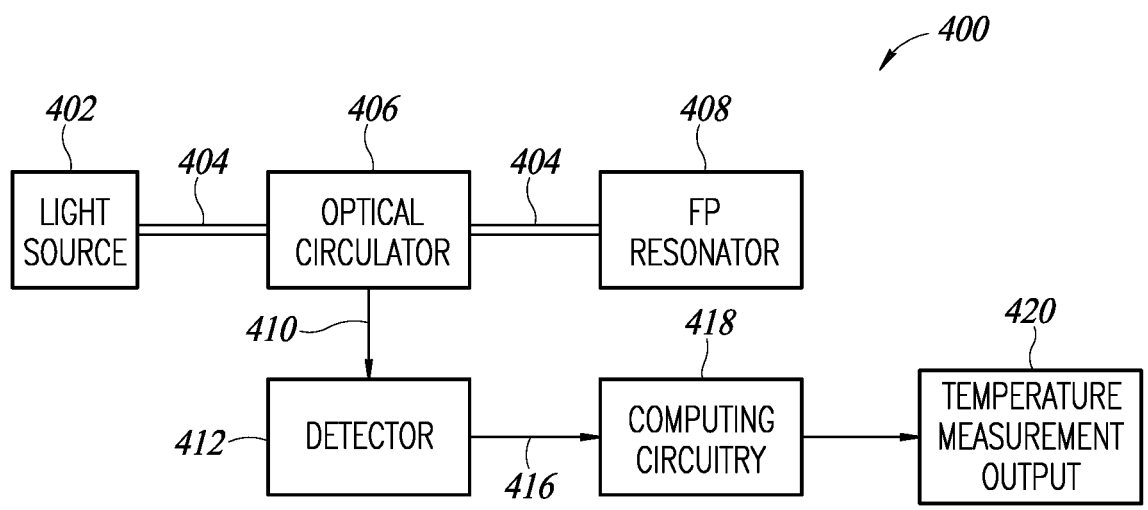
FIG. 4 is an alternative schematic block diagram of a temperature measurement device with a single Fabry-Pérot resonator constructed in accordance with aspects of the present disclosure.

Output light passing through the second reflective surface 114 may be received by a detector 310, as illustrated in FIG. 3. Output light from the FP resonator passing through the first reflective surface 112 back into the optical fiber 100 may travel in superposition with incoming input light and be redirected to a detector 412, as illustrated in FIG. 4.

The first and second reflective surfaces 112, 114, as well as the cavity 110 therebetween, may be constructed using multilayer deposition techniques such as sputtering, electron beam evaporation, or other types of deposition processes. The first reflective surface 112 and/or the second reflective surface 114 may each be constructed of multiple layers of material, as illustrated in FIG. 1. Each layer of material in the reflective surface may have a refractive index that is different than the refractive index of at least one adjacent layer of material. The combination of layers forming the first and second reflective surfaces 112, 114 form a mirror that partially reflects light within the cavity 110 between the reflective surfaces. Depending on the wavelength of the light in the cavity 110 and the temperature of the FP resonator, the light reflected between the first and second reflective surfaces 112, 114 may constructively resonate within the cavity 110 and produce a detectable difference in intensity of output light that passes out of the cavity 110 through the reflective surfaces 112, 114. As will be described herein, this difference in intensity of the output light is detectable by a detector that receives the output light from the FP resonator 108.

Additionally, the cavity 110 may include a channel 116 arranged in a direction between the first reflective surface 112 and the second reflective surface 114. The channel 116 has a width W and is comprised of a material having a different refractive index than material 118 in the cavity surrounding the channel 116. The channel 116 thus forms a waveguide within the cavity 110 of the FP resonator 108. Patterning techniques known in the art may be used to deposit such materials having different refractive indices within the cavity 110 and the channel 116 in the cavity 110.

The material in the channel 116 may have a refractive index profile that varies across the width W of the channel 116. In some cases, the material in the channel 116 may have a single refractive index that differs in a stepwise manner (i.e., a step refractive index) from the refractive index of the material 118 surrounding the channel. In other cases, the material in the channel 116 may have a refractive index profile that varies continuously (i.e., a gradient refractive index) across the width W of the channel. In yet other cases, multiple materials with different refractive indices may be used in the channel 116.

Figure 2A:
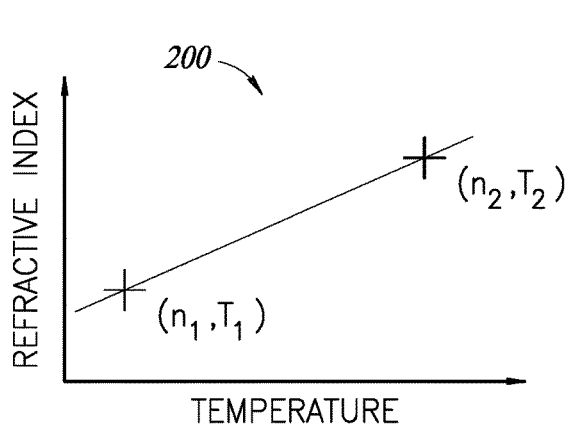
FIG. 2A is a diagram illustrating a relationship between a refractive index of material in the Fabry-Pérot resonator of FIG. 1 and the temperature of the Fabry-Pérot resonator.

FIG. 2A is an example diagram 200 depicting a relationship between a refractive index of material forming the FP resonator 108 of FIG. 1 and the temperature of the FP resonator 108. The FP resonator 108 may be constructed of a material having a refractive index n that changes according to changes in the temperature T of the FP resonator 108. The diagram 200 depicts a relationship between a refractive index, $n_t$, and the temperature, $T_t$, of the FP resonator 108. At a temperature $T_1$, the material in the FP resonator 108 has a refractive index of $n_1$, and at a different temperature $T_2$, the material in the FP resonator 108 has a different refractive index $n_2$. In this example, the change in the refractive index n of the material forming the FP resonator 108 is directly proportional to the change in temperature T of the FP resonator 108, e.g., the refractive index n changes linearly relative to the temperature T of the FP resonator 108. In other implementations, the relationship of the refractive index n and the temperature T may be nonlinear.

Figure 2B:
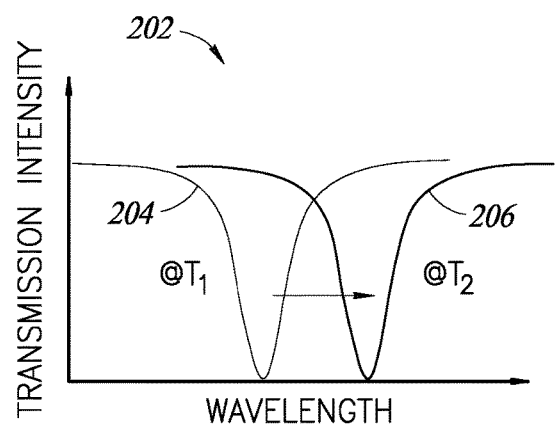
FIG. 2B is a diagram illustrating a change in resonant wavelength of light in the Fabry-Pérot resonator of FIG. 1 relative to different temperatures of the Fabry-Pérot resonator.

FIG. 2B is an example diagram 202 illustrating a change in resonance of an FP resonator, such as the FP resonator 108 of FIG. 1, relative to the temperature of the FP resonator 108. In particular, FIG. 2B depicts two intensity profiles 204, 206 showing a shift in peak intensity of output light emitted from the FP resonator 108 as a result of a change in temperature of the FP resonator 108. For instance, the intensity (or power) of the output light may have a first profile 204 relative to wavelengths of the input light at a first temperature $T_1$ of the FP resonator 108. The intensity of the output light may have a different, second profile 206 relative to wavelength of the input light at a second temperature $T_2$ of the FP resonator 108. The first profile 204 and the second profile 206 depict a shift in the detectable peak resonance (resonant wavelength) of the light in the FP resonator 108, resulting from a change in the temperature of the FP resonator.

The profiles 204, 206 indicate the resonance of the light in the FP resonator 108 with respect different wavelengths of the input light. In some cases as described herein, a detector receiving output light from the FP resonator 108 may detect maximum or minimum intensities of the output light received from the FP resonator 108 to detect the resonance of the FP resonator 108. In some cases, the detector may evaluate changes in the slope of profiles 204, 206 to identify inflection points indicative of maximum or minimum intensities of the output light and thus detect the resonance of the FP resonator 108. As the temperature T of the FP resonator 108 progresses from temperature $T_1$ to $T_2$, the resonance of the FP resonator 108 shifts from a first detectable resonant wavelength to a second detectable resonant wavelength. Because the detected resonant wavelength of the FP resonator is correlated with the temperature of the FP resonator 108, a temperature measurement device may determine the temperature of the FP resonator 108 from the detected resonant wavelength of the FP resonator 108.

FIG. 3 is a schematic block diagram of at least one embodiment of a temperature measurement device 300 with a single FP resonator 306 constructed in accordance with the present disclosure. A light source (e.g., a tunable laser) 302 is configured to emit light having a wavelength that, over a period of time, changes or scans across a range of wavelengths. In some cases, the light source 302 may be coupled to a current ramp (not shown) that controls the light emitted by the light source 302 and causes the emitted light to change wavelength over a range of wavelengths. Under control of the current ramp in this example, the light source 302 emits light at increasing or decreasing wavelengths. In some cases, the light source 302 may be controlled to emit light across the range of wavelengths at a relatively constant rate of change of wavelength. In other cases, the light source 302 may be controlled to emit light at different wavelengths at a variable rate of change.

In some cases, the light source 302 may be controlled so as to produce light in a subrange of wavelengths that is smaller than the maximum output wavelength range of the light source. It may be sufficient to inject light into the temperature measurement device 300 in a short range of wavelengths to obtain a detectable resonant wavelength that corresponds to a temperature of the FP resonator 306. Using a subrange of wavelengths for the light that is input to the FP resonator 306 is advantageous in that, by only needing to scan a shorter subrange of wavelengths, a shorter time for delivery of the input light may result in faster detection of the resonant wavelength of the FP resonator 306, and quicker determination of the temperature of the FP resonator 306.

Light emitted by the light source 302 is coupled into an optical fiber 304 at a first end of the optical fiber 304. The light traverses the optical fiber 304 and at least a portion thereof is coupled into the FP resonator 306 constructed on a second end of the optical fiber 304. As previously described, the FP resonator 306 is constructed of an inorganic optical material that can withstand higher temperatures, e.g., exceeding 600° C.

As the light from the light source 302 scans across a range of wavelengths and a portion of the light in the optical fiber 304 is coupled into the FP resonator 306, the light at a particular wavelength may resonate in the cavity of the FP resonator 306 depending on the temperature of the FP resonator 306. A portion of the light in the FP resonator 306 is output from the FP resonator 306 as output light 308. The output light 308 is received by a detector 310 and a resonance in the output light 308 is detected by the detector 310.

In some cases, the detector 310 may be a photodetector configured to produce an electric signal 312 that is indicative of a detected resonance of the light in the FP resonator 306. Computing circuitry 314 receives the signal 312 and determines the resonance of the FP resonator 306 based on the intensity or power of the output light 308 as indicated in the signal 312.

The computing circuitry 314 is comprised of one or more processors with associated memory in which programmed instructions cause the one or more processors to evaluate the signal 312 and determine the resonance of the FP resonator 306. In some cases, the programmed instructions cause the one or more processors to determine the wavelength at which the optical intensity or power of the output light 308 from the FP resonator 306 peaks (maximum or minimum), thus indicating a peak resonance (resonant wavelength or frequency) of the light in the FP resonator 306. Other ways for determining the resonance of the FP resonator 306 may also be used. For example, the computing circuitry may use components that provide frequency locking, which tracks the wavelength of the output light 308 and reports a detected peak wavelength. In some cases, as will be described below with respect to the embodiments shown in FIGS. 5-9 where multiple FP resonators are used, the computing circuitry 314 may be programmed to detect two or more peaks in the optical intensity or power of the output light, and thus determine two or more resonant wavelengths in the output light.

Upon detecting a resonance (e.g., resonant wavelength or frequency) of the FP resonator 306 in the signal 312, the computing circuitry 314 is configured to determine a temperature of the FP resonator 306 based on the detected resonance and a predetermined relationship known or obtainable by the computing circuitry 314 that correlates the detected resonance of the FP resonator 306 with the temperature of the FP resonator 306. The predetermined relationship may correlate a range of resonances with a range of temperatures of the FP resonator. In some cases, the relationship is a calibrated characteristic curve that relates resonances to temperatures.

The relationship between a detected resonance and the temperature of an FP resonator may be determined by a calibration process and represented by, for example, a mathematical model or equation that provides a continuous correlation between resonance wavelengths and temperatures of the FP resonator. In other cases, the relationship may be represented by a lookup table that provides discrete correlations between resonance wavelengths and temperatures of the FP resonator. If needed, the computing circuitry 314 may interpolate between discrete resonance wavelengths and corresponding temperature values in the lookup table to determine the temperature of the FP resonator based on a detected resonance in the signal 312.

In the embodiment illustrated in FIG. 3, the computing circuitry 314 is communicatively coupled to a temperature measurement output 316. The temperature measurement output 316 may be, for example, a display (such as an LCD or LED display) that outputs a temperature reading representing the temperature detected by the temperature measurement device 300. In some cases, the temperature measurement output 316 may be a networking node in which a value representing the temperature measurement is communicated to one or more remote computing devices coupled to a network. The temperature measurement that is output by the temperature measurement device 300 is based on the temperature of the FP resonator 306. In some cases, the temperature measurement output 316 reports a temperature measurement that equals the determined temperature of the FP resonator 306. In other cases, a calibration may be used to correlate the temperature of the FP resonator 306 to the reported output temperature measurement for the environment in which the temperature measurement device 300 is deployed.

FIG. 4 is an alternative schematic block diagram of a temperature measurement device 400 constructed in accordance with aspects of the present disclosure. The temperature measurement device 400 includes a light source 402, an FP resonator 408, a detector 412, computing circuitry 418, and a temperature measurement output 420 that operate similar to the light source 302, FP resonator 306, detector 310, computing circuitry 314, and temperature measurement output 316 described above with respect to FIG. 3. The temperature measurement device 400 differs from the temperature measurement device 300 in that an optical circulator 406 is arranged along an optical fiber 404 that receives input light from the light source 402. The optical circulator 406 is configured to direct light emitted from the light source 402 toward the FP resonator 408, and to direct output light received from the FP resonator 408 toward the detector 412.

The FP resonator 408 is constructed of inorganic optical material on an end of the optical fiber 404. Light emitted by the light source 402 and directed by the optical circulator 406 is carried by the optical fiber 404 to the FP resonator 408. A portion of the light in the optical fiber 404 is coupled into the cavity of the FP resonator 408, and the light in the cavity of the FP resonator 408 resonates at different wavelengths depending on the temperature of the FP resonator 408.

Output light from the FP resonator 408 may pass through a reflective surface (e.g., first reflective surface 112 shown in FIG. 1) back into the optical fiber 404 and travel in superposition with input light from the light source 402 that is also traversing the optical fiber 404. The optical circulator 406 redirects the output light 410 to the detector 412. The detector 412 (which may be constructed similar to the detector 310) produces a signal 416 that is received by the computing circuitry 418. The signal 416 is indicative of detected optical intensity or power of the output light 410 and thus indicative of a detected resonance of the light in the FP resonator 408.

The computing circuitry 418 is configured to evaluate the signal 416 and determine the resonance of the FP resonator 408, e.g., by determining a peak resonance (resonant wavelength or frequency) of the FP resonator 408 as indicated in the signal 416. The computing circuitry 418 determines a temperature of the FP resonator 408 based on the detected resonance and a predetermined relationship, as previously described, that correlates the detected resonance of the FP resonator 408 with the temperature of the FP resonator 408. The temperature measurement determined by the computing circuitry 418 is communicated to the temperature measurement output 420 for local display for example, or for communication to one or more remote computing devices.

Figure 5:
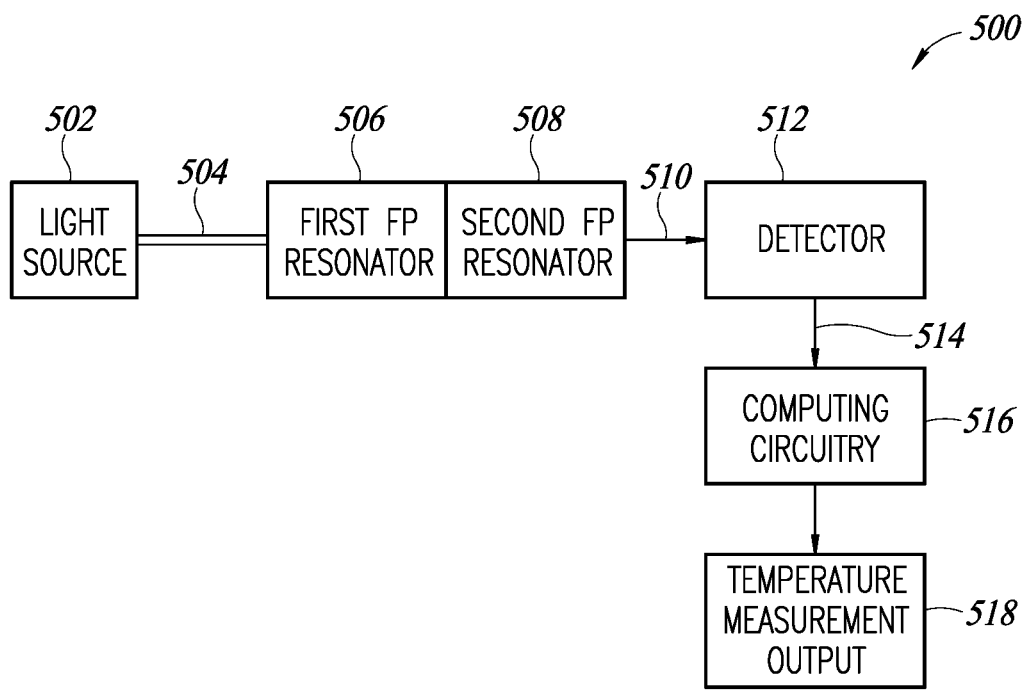
FIG. 5 is a schematic block diagram of at least one embodiment of a temperature measurement system with multiple Fabry-Pérot resonators constructed in accordance with the present disclosure.

FIG. 5 is a schematic block diagram of at least one embodiment of a temperature measurement system 500 with multiple FP resonators 506, 508 constructed in accordance with the present disclosure. The temperature measurement system 500 includes a temperature measurement device having components as shown in FIG. 3, including a light source 502, a first FP resonator 508, a detector 512, computing circuitry 516, and a temperature measurement output 518, that operate similar to the light source 302, FP resonator 306, detector 310, computing circuitry 314, and temperature measurement output 316 of the temperature measurement device 300 in FIG. 3. The temperature measurement system 500 differs in that the temperature measurement system 500 includes a second FP resonator 508 that is constructed and arranged in series with the first FP resonator 506.

The light source 502 emits light across a range of wavelengths and this light is injected into an optical fiber 504. The first FP resonator 506 is constructed of an inorganic optical material on an end of the optical fiber 504. A portion of the light carried by the optical fiber 504 is coupled into the cavity of the first FP resonator 506, which produces an output light as previously described with respect to the FP resonator 306 shown in FIG. 3. In FIG. 4, the output light from the first FP resonator 506 is coupled into the second FP resonator 508.

The second FP resonator 508 is constructed on an end of the first FP resonator 506 opposite to the end of the first FP resonator 506 that is on the end of the optical fiber 504. The second FP resonator 508 may be constructed using similar techniques as described above with respect to the FP resonator 306 in FIG. 3, e.g., by depositing layers of material having different refractive indices forming first and second reflective surfaces as well as the material forming a cavity in the FP resonator 508, possibly with a channel having a different refractive index and forming a waveguide, as described with respect to FIG. 3.

Output light from the first FP resonator 506 is coupled into the cavity of the second FP resonator 508 and resonates in the second FP resonator 508 at a resonance that varies with temperature of the second FP resonator 508. A portion of the light in the second FP resonator 508 is output as output light 510 from the second FP resonator 508. This output light 510 is received by The detector 512 is arranged to receive the output light 510 from second FP resonator 508, and produce a signal 514 indicative of detected intensities of the output light 510. The output light 510 may include resonant peaks indicative of a resonance of light in the first FP resonator 506 and/or a resonance of light in the second FP resonator 508.

The signal 514 indicates a resonance in the output light 510, e.g., by indicating detected maximum or minimum intensities (peaks) of the output light 510 that the computing circuitry 516 can use to determine the resonance of the first and/or second FP resonators 506, 508. In this manner, the signal 514 produced by the detector 512 indicates at least one of a first detected resonance of the light in the first FP resonator 506 or a second detected resonance of the light in the second FP resonator 508.

The computing circuitry 516 is configured to receive the signal 514 indicating the first detected resonance or the second detected resonance and based thereon, determine at least one of a first temperature of the first FP resonator 506 or a second temperature of the second FP resonator 508 (which can include determining both first and second temperatures of the first and second FP resonators 506, 508). The computing circuitry 516 is configured to determine the first temperature of the first FP resonator 506 based on the first detected resonance in the signal 514, and similarly, the computing circuitry 516 is configured to determine the second temperature of the second FP resonator 508 based on the second detected resonance in the signal 514. The computing circuitry 516 uses the first detected resonance and/or the second detected resonance in conjunction with a predetermined first and/or second relationship that respectively correlates the first and/or second detected resonance with the temperature of the first and/or second FP resonators 506, 508. The computing circuitry 516 thereafter outputs a temperature measurement to the temperature measurement output 518 based on at least one of the first temperature of the first FP resonator 506 or the second temperature of the second FP resonator 508 (which can include outputting both the first and second temperatures). In some cases, the computing circuitry 516 may output multiple temperature measurements to the temperature measurement output 518, corresponding to temperature measurements obtained from multiple FP resonators in the temperature measurement system 500.

Using multiple FP resonators in a temperature measurement system can provide several advantages. For example, in at least one implementation, the overall range of temperatures that the temperature measurement system 500 can measure may be divided into multiple subranges of temperatures. The first FP resonator 506 may be sized and constructed of optical materials that are selected to detect a temperature in a first subrange of temperatures, while the second FP resonator 508 may be sized and constructed of optical materials that are selected to detect a temperature in a second subrange of temperatures that is different than the first subrange of temperatures. Collectively, the first and second temperature subranges may cover an overall range of temperatures to be measured by the temperature measurement system 500. The temperature measurement system 500 achieves accurate temperature measurements over a wide range of temperatures by taking advantage of different sizing and/or optical materials in the multiple FP resonators which, at a given temperature, cause light to resonate in at least one of the FP resonators 506, 508, at a wavelength within the same range of wavelengths emitted by the light source 502 (which may be a short range of wavelengths) and injected into the optical fiber 504.

An advantage of dividing the overall temperature range of the temperature measurement system 500 into multiple temperature subranges is that each FP resonator in the temperature measurement system 500 may be tuned to detect a temperature in a respective temperature subrange using the same range of wavelengths of light emitted by the light source 502. In other words, instead of requiring the light source 502 to be tunable to emit light over a wide range of wavelengths (which can be very expensive), implementations of the temperature measurement system 500 may use a light source that emits light over a shorter range of wavelengths (which can significantly decrease the complexity and cost of the temperature measurement system 500). For a given temperature of the first and second FP resonators 506, 508, within the (shorter) range of wavelengths emitted by the light source 502, at least one of the first or second FP resonators 506, 508 is configured to produce a resonance that is detectable by the detector 512 and output in the signal 514 to the computing circuitry 516.

The computing circuitry 516 may be configured to determine which FP resonator of the first or second FP resonators 506, 508 produced the resonance that is detected by the detector 512, and using the detected resonance, determine the temperature of the respective first or second FP resonator based on the detected resonance and a relationship associated with the respective first or second FP resonator that correlates the detected resonance with the temperature of the respective first or second FP resonator. For example, with the temperature measurement system 500 shown in FIG. 5, a resonant peak intensity produced by the first FP resonator 506 may be diminished in value before it is detected by the detector 512 because the output light of the first FP resonator 506 (which includes the resonant peak intensity of the first FP resonator) must first traverse the second FP resonator 508 before the output light is detected by the detector 512. Consequently, a resonant peak intensity of the second FP resonator 508 would be expected to have an intensity that exceeds the intensity of a resonant peak intensity produced by the first FP resonator 506. The computing circuitry 516 is able to determine the temperature of the first or second FP resonator 506, 508 by selecting and applying a predetermined relationship that is associated with the respective first or second FP resonator, to correlate the detected resonance of the respective first or second FP resonator with the temperature of the respective first or second FP resonator. In other cases, the computing circuitry 516 may distinguish whether a detected peak intensity in the output light 510 derives from resonance in the first FP resonator 506 or the second FP resonator 508 by recognizing the wavelengths at which the first and second FP resonators are expected to resonate in the temperature range that the temperature measurement system 500 is operating.

In another implementation of the temperature measurement system 500, both the first and second FP resonators 506, 508 may be constructed of materials and tuned to produce a detectable resonance over similar temperature ranges. For example, in at least one implementation, the first FP resonator 506 may be tuned to produce a coarse (or rough) temperature determination having a broader range of error, while the second FP resonator 508 may be tuned to produce a finer, more precise determination of temperature. When the first and second FP resonators 506, 508 are operating correctly, the finer temperature measurement produced by the second FP resonator 508 should fall within the measured temperature range produced by the first FP resonator 506. In other words, the coarse temperature determination obtained using the first FP resonator 506 can be used to verify that the finer determination obtained using the second FP resonator 508 is correct.

In yet another implementation, both of the first and second FP resonators 506, 508 may be similarly tuned to detect a temperature in the same temperature range with the same or similar precision. With this implementation, when one of the FP resonators is drifting from calibration more than the other FP resonator, the computing circuitry 516 may produce a temperature measurement that is still more accurate than if a single (drifting) FP resonator was used. The computing circuitry 516 may produce a mathematical combination (e.g., compute an average of) the two temperatures determined from the first and second FP resonators 506, 508. The temperature measurement system 500 is thus able to provide, over a longer term, more accurate temperature measurements.

Figure 6:
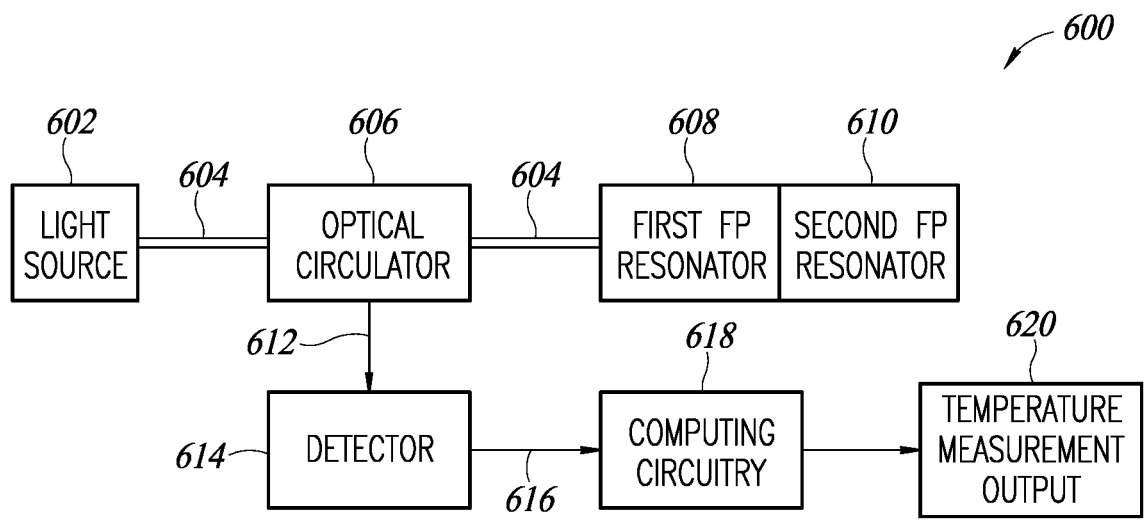
FIG. 6 is an alternative schematic block diagram of a temperature measurement system with multiple Fabry-Pérot resonators constructed in accordance with aspects of the present disclosure.

FIG. 6 is an alternative schematic block diagram of a temperature measurement system 600 with multiple FP resonators 608, 610 constructed in accordance with aspects of the present disclosure. The temperature measurement system 600 includes a temperature measurement device with components similar to those shown in FIG. 3, including a light source 602, a first FP resonator 608, a detector 614, computing circuitry 618, and a temperature measurement output 620 that operate similar to the light source 302, FP resonator 306, detector 310, computing circuitry 314, and temperature measurement output 316 described above with respect to the temperature measurement device 300 shown in FIG. 3.

Similar to FIG. 5, the temperature measurement system 600 differs from the temperature measurement device 300 in that the temperature measurement system 600 includes a second FP resonator 610 that is constructed and arranged in series with the first FP resonator 608. Input light that is scanned across a range of wavelengths is injected by the light source 602 into an optical fiber 604. An optical circulator 606 is arranged along the optical fiber 604 to direct light emitted from the light source 602 toward the first and second FP resonators 608, 610, and to direct reflected output light from the first and second FP resonators 608, 610 toward the detector 614.

Similar to the first and second FP resonators 506, 508 shown in FIG. 5, the first and second FP resonators 608, 610 shown in FIG. 6 are constructed of inorganic optical materials. Also, in some cases, both the cavity of the first FP resonator 608 and the cavity of the second FP resonator 610 may include a channel comprised of material having a different refractive index than material in the respective cavity surrounding the channel, thus providing a waveguide that can produce a sharper, detectable resonant wavelength peak. The first FP resonator 608 is constructed on an end of the optical fiber 604, while the second FP resonator 610 is constructed on the end of the first FP resonator 608. A portion of the light in the optical fiber 604 is coupled into the cavity of the first FP resonator 608, which produces output light that is coupled into the cavity of the second FP resonator 610. In each of the first and second FP resonators 608, 610, light may resonate at a particular wavelength for a given temperature of the respective first and second FP resonators.

The first and second FP resonators 608, 610 may be constructed using similar techniques as described above. Output light from the second FP resonator 610 may be reflected back through the first FP resonator 608 into the optical fiber 604 and travel in superposition with input light from the light source 602 that is present in the optical fiber 604. The optical circulator 606 directs the output light 612 to the detector 614, which produces a signal 616 that is delivered to the computing circuitry 618. The computing circuitry 618 may determine the resonance of the first and/or second FP resonators 608, 610, e.g., by determining a peak optical intensity in the output light 612 detected by the detector 614 as discussed above. The computing circuitry 618 determines a temperature of at least one (or both) of the FP resonators 608, 610 based on a detected resonance and a predetermined relationship, as previously described, associated with the respective first FP resonator 608 or second FP resonator 610, that correlates the detected resonance with the temperature of the first and/or second FP resonator 608, 610. The computing circuitry 618 communicates the determined temperature measurement(s) to the temperature measurement output 620 for local display or for communication to one or more remote computing devices. In cases where the computing circuitry 618 determines both a first temperature of the first FP resonator 608 and a second temperature of the second FP resonator 610, the computing circuitry may determine a combination of the first and second temperatures and output a combined temperature measurement 620, e.g., as described with respect to FIG. 5.

In some implementations, the first FP resonator 608 may be constructed of a material having different optical properties than the material used to construct the second FP resonator 610 such that, for a given temperature of the first and second FP resonators 608, 610, light in the first FP resonator 608 resonates at a different resonance than light in the second FP resonator 610. This may be advantageous in cases where multiple FP resonators are used in a temperature measurement system to detect different temperatures in different temperature subranges based on the same wavelength range of input light injected into the temperature measurement system.

Figure 7:
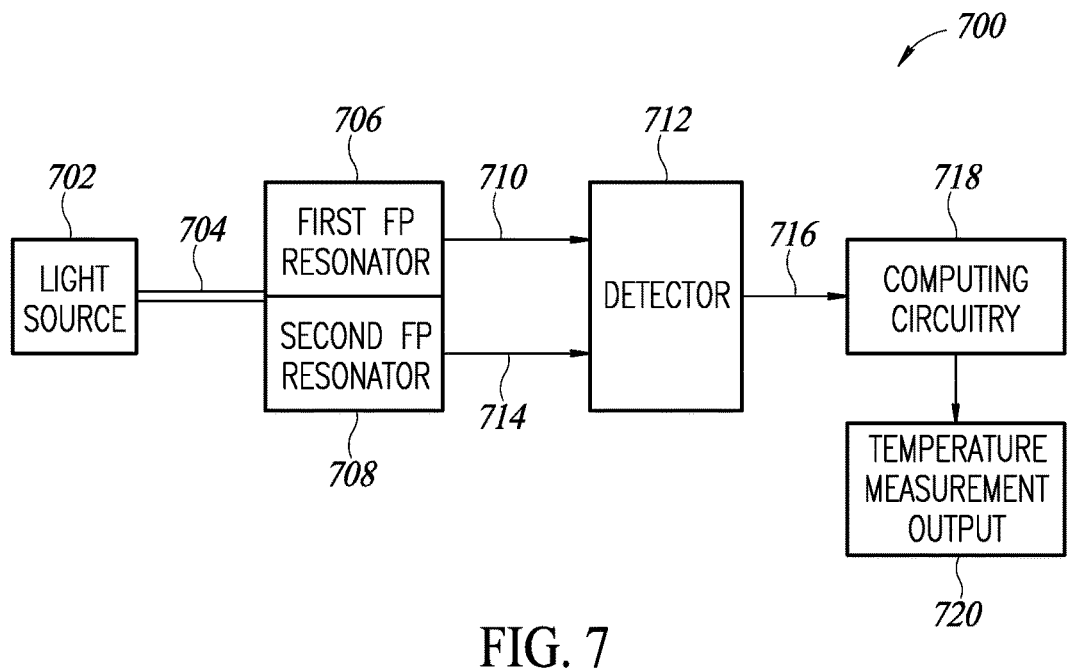
FIG. 7 is a schematic block diagram of another embodiment of a temperature measurement system with multiple Fabry-Pérot resonators constructed in accordance with the present disclosure.

FIG. 7 is a schematic block diagram of another embodiment of a temperature measurement system 700 with multiple FP resonators 706, 708 constructed in accordance with the present disclosure. A light source 702 emits light over a range of wavelengths as previously described, and this light is injected into an optical fiber 704. In contrast with the temperature measurement systems 500, 600 shown in FIGS. 5 and 6, where multiple FP resonators are constructed in series, in the temperature measurement system 700 the multiple FP resonators 706, 708 are constructed in parallel.

In particular, the first FP resonator 706 and the second FP resonator 708 are both constructed of an inorganic optical material on an end of the optical fiber 704. A portion of the light traversing the optical fiber 704 is coupled into a cavity of the first FP resonator 706, while another portion of the light traversing the optical fiber 704 is coupled into a cavity of the second FP resonator 708. In this manner, light coupled into the respective cavities of the first and second FP resonators 706, 708 may resonate within the respective cavities according to the dimensions and optical characteristics of the material used to construct the respective first and second FP resonators. In both of the first and second FP resonators 706, 708, light in a respective FP resonator resonates at a resonance that varies with the temperature of the respective FP resonator.

It should be understood that the first and second FP resonators 706, 708 may be constructed with different cavities between different reflective surfaces. Alternatively, the first and second FP resonators 706, 708 may share reflective surfaces, with a shared cavity therebetween, in which each FP resonator 706, 708 is achieved by using a different channel 116 (see FIG. 1) that extends, e.g., in parallel, from one reflective surface toward the other reflective surface. In other words, the first and second FP resonators 706, 708 may be formed by different waveguides (channels) in a shared FP cavity. The different waveguides (channels) may be formed using different materials and/or have different geometric properties to provide different resonant characteristics.

The embodiment of the temperature measurement system 700 shown in FIG. 7 uses a single detector 712 that is configured to receive output light 710 from the first FP resonator 706 as well as output light 714 from the second FP resonator 708. The detector 712, for example, may have a single photosensitive substrate where the output light 710 impinges upon a first portion of the photosensitive substrate while the output light 714 impinges upon a second portion of the photosensitive substrate. In other cases, the detector 712 may be a unitary device that includes multiple photosensitive surfaces arranged to receive the respective output light 710 and 714. The detector 712 produces a signal 716 that indicates at least one of a first detected resonance of the light in the first FP resonator 706 or a second detected resonance of the light in the second FP resonator 708.

In some cases, the detector 712 is configured to detect in the output light 710, 714 two or more resonances (resonant wavelengths or frequencies) of the first and/or second FP resonators 706, 708. The computing circuitry 718 may be programmed to select from the two or more detected resonances at least one resonance that is used to determine a temperature measurement. The at least one resonance may be selected based on which of the two (or more) output lights 710, 714 indicates a resonance of greater intensity. In some cases, a resonance having a greater intensity in one of the output lights 710, 714 is indicative of a wavelength having a stronger correlation to the temperature of the respective FP resonator producing the resonance of greater intensity, and using the wavelength of greater resonance in the temperature correlation processes described herein may yield a more-accurate temperature measurement of the temperature measurement system 700. In addition to possibly providing a better temperature correlation, an output light having a wavelength of greater intensity has a larger signal-to-noise ratio, providing greater confidence in the detection of a resonant wavelength in the respective FP resonator.

In some cases, the first FP resonator 706 may be configured by dimensions or materials to produce a resonant wavelength in a first subrange of temperatures while the second FP resonator 708 is configured by dimensions or materials to produce a resonant wavelength in a different, second subrange of temperatures, even though the light carried by the optical fiber 704 from the light source 702 is scanned across the same range of input light wavelengths. The detector 712 may discriminate whether a detected resonance is a first detected resonance in the first output light 710 or a second detected resonance in the second output light 714, for example, by determining which portion of the photosensitive substrate of the detector 712 was impinged by the resonant light.

In some cases, the detector 712 and/or the computing circuitry 718 may discriminate whether a detected resonance is produced by the first FP resonator 706 or the second FP resonator 708 by receiving a first coarse temperature measurement from a separate thermometer arranged adjacent to the temperature measurement system 700. Each of the first FP resonator 706 and second FP resonator 708 may be tuned differently to produce a resonant wavelength over different subranges of wavelengths. Depending on the coarse temperature measurement from the separate thermometer, the detector 712 and/or the computing circuitry 718 may identify which FP resonator 706, 708 produced the resonance based on knowledge of which temperature subrange includes the coarse temperature measurement.

In any event, the detector 712 produces a signal 716 that indicates a detected resonance in at least one of the output light 710 and/or 714, and the signal 716 is received by the computing circuitry 718. The computing circuitry 718 utilizes a predetermined relationship (embodied, for example, in a mathematical equation or lookup table as previously described) that correlates the detected resonance with the temperature of first or second FP resonator 706, 708. After receiving the signal 716 indicating at least one of the first detected resonance or the second detected resonance, the computing circuitry 718 is configured to determine at least one of a first temperature of the first FP resonator 706 or a second temperature of the second FP resonator 708. The computing circuitry 718 determines the first temperature of the first FP resonator 706 based on the first detected resonance in the output light 710 and a first relationship that correlates the first detected resonance with the temperature of the first FP resonator 706. The second temperature of the second FP resonator 708 may be determined based on the second detected resonance in the output light 714 and a second relationship that correlates the second detected resonance with the second temperature of the second FP resonator 708. Having determined at least one of the first temperature of the first FP resonator 706 or the second temperature of the second FP resonator 708 in this manner, the computing circuitry 718 may output a temperature measurement to the temperature measurement output 720 based on at least one of the determined first temperature of the first FP resonator 706 or the determined second temperature of the second FP resonator 708.

In some cases, the signal 716 produced by the detector 712 indicates both a first detected resonance of the light in the first FP resonator 706 and a second detected resonance of the light in the second FP resonator 708, and the computing circuitry 718 uses one or both determined resonator temperatures to output a temperature measurement of the system.

In some cases, the optical fiber 704 is a multicore optical fiber comprising at least a first core and a second core. This may be advantageous in that the first FP resonator 706 may be situated such that light in the first core is coupled into the cavity of the first FP resonator 706, while the second FP resonator 708 may be situated such that light in the second core is coupled into the cavity of the second FP resonator 708. A multicore optical fiber may have any number of cores, e.g, a 3-core, 7-core, 13-core, 19-core optical fiber, etc., coupled with any number of FP resonator(s) on the end of the optical fiber to receive light from the cores.

In some cases, the cavity of the first FP resonator 706 includes a first channel comprised of a material having a different refractive index than material in the cavity surrounding the first channel. Alternatively or in addition, the cavity of the second FP resonator 708 includes a second channel comprised of material having a different refractive index than material in the cavity surrounding the second channel. Where the first and second FP resonator 706, 708 are both constructed on the end of the optical fiber 704 and receive light carried by the optical fiber 704, the light in the optical fiber 704 is coupled into both the first channel of the first FP resonator 706 and the second channel of the second FP resonator 708 to produce sharper, detectable resonant peaks in the output light.

Figure 8:
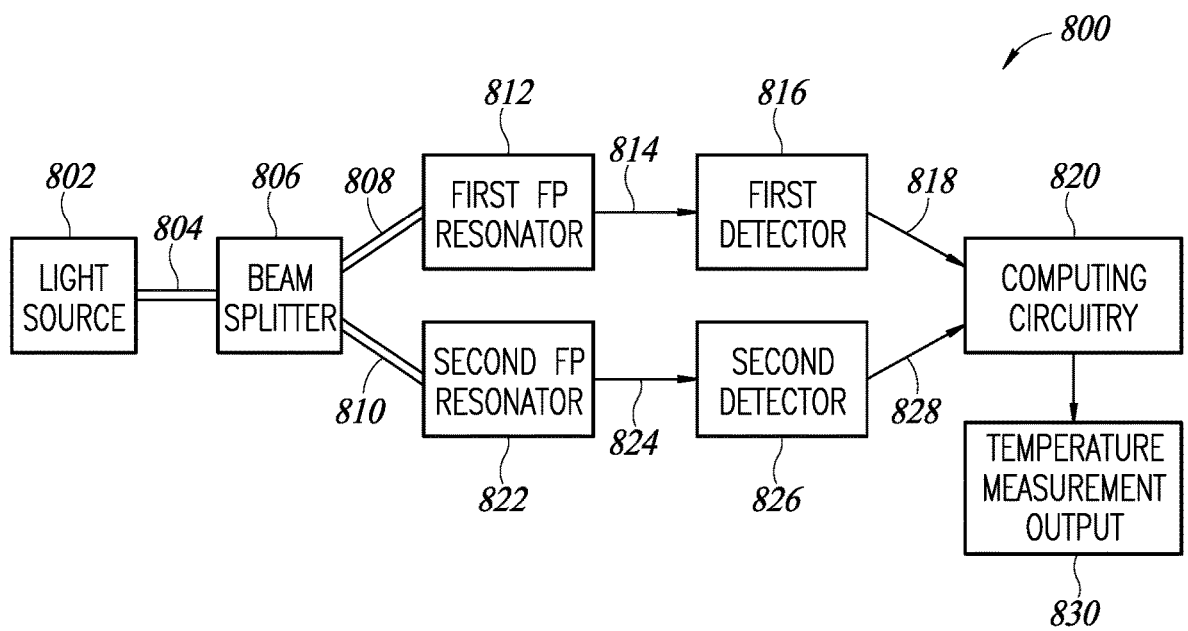
FIG. 8 is an alternative schematic block diagram of a temperature measurement system with multiple Fabry-Pérot resonators constructed in accordance with aspects of the present disclosure.

FIG. 8 is an alternative schematic block diagram of a temperature measurement system 800 with multiple FP resonators 812, 822 constructed in accordance with aspects of the present disclosure. The multiple FP resonators 812, 822 in FIG. 8 are configured to operate in parallel, similar to the multiple FP resonators 706, 708 shown in FIG. 7. Also, as with the temperature measurement system 700, the temperature measurement system 800 includes components similar to the components of the temperature measurement device 300 shown in FIG. 3, including a light source 802, a (first) FP resonator 812, a (first) detector 816, computing circuitry 820, and a temperature measurement output 830, which may operate similar to the light source 302, FP resonator 306, detector 310, computing circuitry 314, and temperature measurement output 316 shown and described with respect to FIG. 3.

However, system 800 includes a number of differences that structurally distinguish system 800 from the temperature measurement device 300 shown in FIG. 3 and the temperature measurement system 700 shown in FIG. 7. Light emitted by the light source 802 over a range of wavelengths is injected into an optical fiber 804. The input light carried by the optical fiber 804 is received by a beam splitter 806 that divides the input light from the light source 802 and outputs a first portion of the input light to a first optical fiber 808 and a second portion of the input light into a second optical fiber 810.

Constructed on the end of the first optical fiber 808 is the first FP resonator 812, while constructed on the end of the second optical fiber 810 is the second FP resonator 822. Portions of the input light carried by the first optical fiber 808 and the second optical fiber 810 are coupled respectively into cavities of the respective first and second FP resonators 812, 822. Depending on dimensions and materials used to construct the first and second FP resonators 812, 822, the portions of the input light coupled into the respective first and second FP resonators may resonate at different wavelengths according to the respective temperatures of the first and second FP resonators.

FIG. 8 also depicts separate first and second to detectors 816, 826, operating in parallel. The first detector 816 receives output light 814 from the first FP resonator 812, while the second detector 826 receives output light 824 from the second FP resonator 822. Each of the first and second detectors 816, 826 may be constructed similar to the detectors previously described herein, including the detector 310 shown in FIG. 3. Each of the first and second detectors 816, 826 outputs respective signals 818, 828 indicative of detected resonances in the respective output light 814, 824. The signals 818, 828 are received by computing circuitry 820, which evaluates the light intensities in the respective signals 818, 828 to determine first and/or second detected resonances of the respective first and/or second FP resonators 812, 822. The signal 818 is thus a first signal from the first detector 816 indicating a first detected resonance of the light in the first FP resonator 812. Similarly, the signal 828 is a second signal from the second detector 826 indicating a second detected resonance of the light in the second FP resonator 822.

Both of the first and second FP resonators are constructed of an inorganic optical material that is capable of retaining functional integrity at higher temperatures, e.g. exceeding 600° C. or higher. Light in the respective cavities of the first and second FP resonators 812, 822 resonates at first and second resonances that vary according to the temperature of the respective first and second FP resonators 812, 822.

The computing circuitry 820 is configured to receive at least one of the first signal 818 indicating the first detected resonance of the first FP resonator 812 or the second signal 828 indicating the second detected resonance of the second FP resonator 822, or both the first and second signals 818, 828 shown in FIG. 8. The computing circuitry 820 is thereafter configured to determine at least one of a first temperature of the first FP resonator 812 or the second temperature of the second FP resonator 822. The computing circuitry 820 is configured to determine the first temperature of the first FP resonator 812 based on the first detected resonance and a first relationship that correlates the first detected resonance with the temperature of the first FP resonator 812. The computing circuitry 820 is also configured to determine the second temperature of the second FP resonator 822 based on the second detected resonance and a second relationship that correlates the second detected resonance with the temperature of the second FP resonator 822. One or both of the determined first temperature of the first FP resonator 812 or the second temperature of the second FP resonator 822 is (or are) communicated to the temperature measurement output 830 for local display or communication to one or more remote computing devices.

In cases where the computing circuitry determines both the first temperature of the first FP resonator 812 and the second temperature of the second FP resonator 822, the computing circuitry may be configured to output an overall temperature measurement based on a combination of the first temperature and the second temperature, e.g., as described earlier with respect to FIG. 5.

Figure 9:
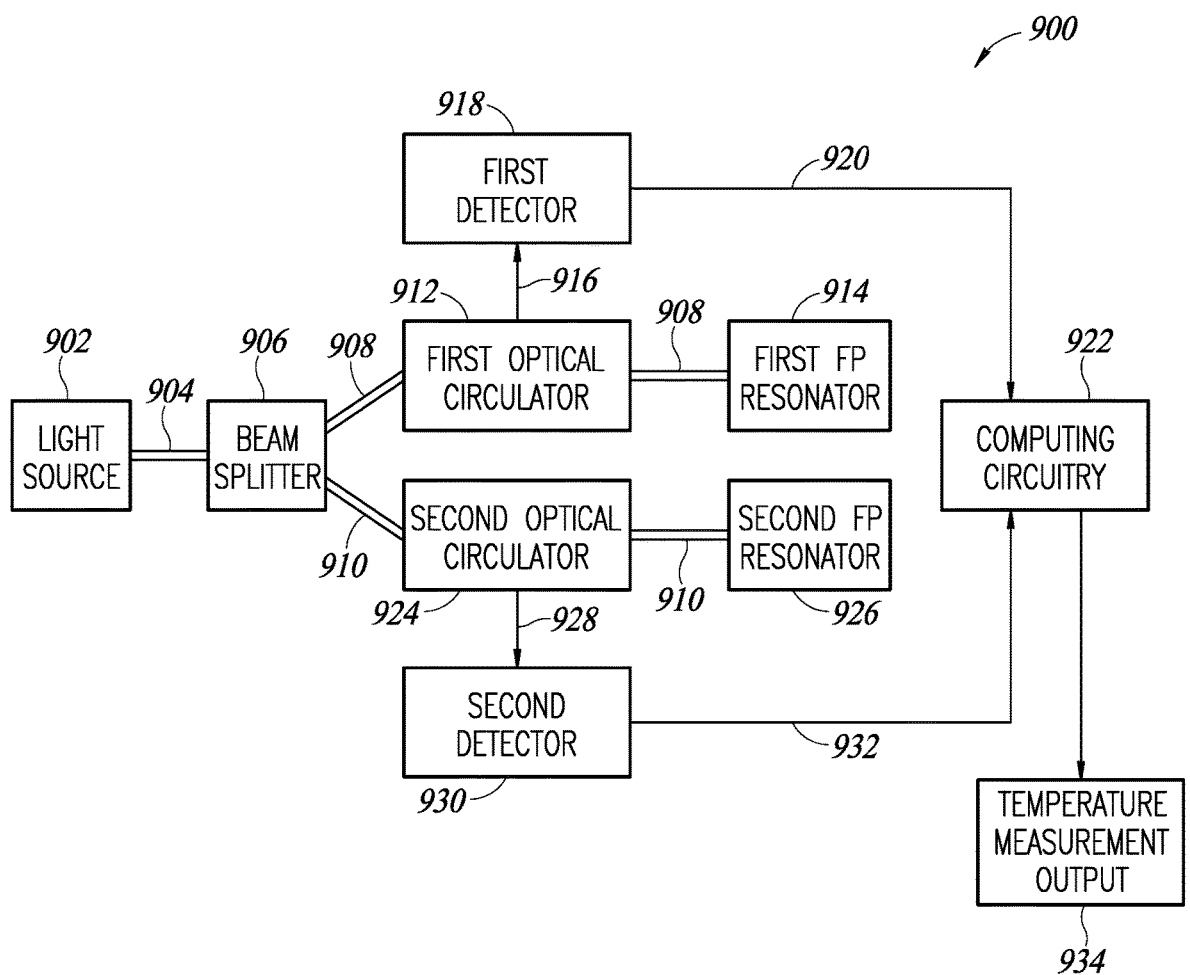
FIG. 9 is a schematic block diagram of another embodiment of a temperature measurement system with multiple Fabry-Pérot resonators constructed in accordance with the present disclosure.

FIG. 9 is a schematic block diagram of another embodiment of a temperature measurement system 900 with multiple FP resonators 914, 926 constructed in accordance with the present disclosure. Similar to the temperature measurement system 800 shown in FIG. 8, the temperature measurement 900 includes a light source 902 that injects light over a range of wavelengths into an optical fiber 904. The light in the optical fiber 904 is divided by a beam splitter 906 such that a first portion of the light is carried by a first optical fiber 908 and a second portion of the light is carried by a second optical fiber 910. Similar to the temperature measurement systems 400 and 600 shown in FIGS. 4 and 6, the temperature measurement system 900 in FIG. 9 includes an optical circulator, namely a first optical circulator 912 arranged along a length of the first optical fiber 908 and a second optical circulator 924 arranged along a length of the second optical fiber 910. The first optical circulator 912 is configured to direct input light carried by the first optical fiber 908 toward the first FP resonator 914, while the second optical circulator 924 is configured to direct input light carried by the second optical fiber 910 toward the second FP resonator 926. A portion of the light in the respective first and second optical fibers 908, 910 is optically coupled into cavities of the respective first and second FP resonators 914, 926, and resonates in the respective cavities depending on the temperature of the first and second FP resonators.

Resonant output light reflected by the first and second FP resonators 914, 926 returns along the optical fibers 908, 910 to the first and second optical circulators 912, 924 which respectively direct the output light to first and second detectors 918, 930. In particular, the first detector 918 receives output light 916 from the first optical circulator 912, while the second detector 938 receives output light 928 from the second optical circulator 924. The first detector 918 produces a first signal 920 indicative of a resonance in the output light 916, while the second detector 930 produces a second signal 932, indicative of a resonance in the output light 928.

As illustrated in FIG. 9, computing circuitry 922 is configured to receive both the first signal 920 and the second signal 932 and evaluate detected resonances in the first and/or second signals 920, 932. The computing circuitry is further configured to determine at least one of a first temperature of the first FP resonator 914 or a second temperature of the second FP resonator 926. The first temperature of the first FP resonator 914 is determined based on the first detected resonance and a first relationship that correlates the first detected resonance with the temperature of the first FP resonator 914. Similarly, the second temperature of the second FP resonator 926 is determined based on the second detected resonance and a second relationship that correlates the second detected resonance with the second temperature of the second FP resonator 926. The computing circuitry 922 outputs one or both of the determined first temperature and/or second temperature to the temperature measurement output 934 for local display or communication to one or more remote computing devices.

Figure 10:
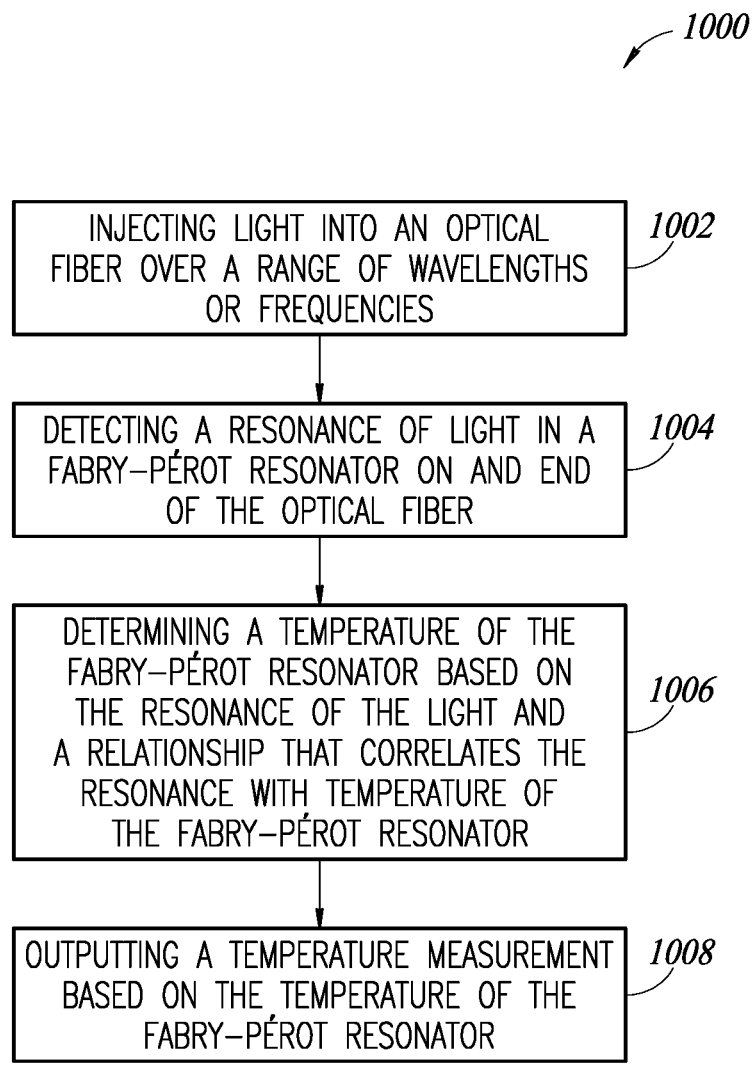
FIG. 10 is a flow diagram illustrating at least one embodiment of a method for temperature measurement in accordance with the present disclosure.

FIG. 10 is a flow diagram illustrating at least one embodiment of a method 1000 for temperature measurement in accordance with the present disclosure. All of the embodiments of the temperature measurement devices and systems shown in FIGS. 3-9 operate according various method steps as previously described. The method 1000 is an example illustrating the basic steps of a temperature measurement device, e.g., a temperature measurement device 300, 400 as shown in FIG. 3 or 4.

The method 1000 includes, at step 1002, injecting light into an optical fiber from a light source that emits light over a range of wavelengths or frequencies. At step 1004, the method includes detecting a resonance of light in a Fabry-Pérot (FP) resonator constructed of an inorganic optical material on an end of the optical fiber. Light in the optical fiber is coupled into a cavity of the FP resonator and resonates at a resonance that varies with temperature of the FP resonator.

At step 1006, the method includes determining a temperature of the FP resonator based on the resonance of the light in the FP resonator and a relationship that correlates the resonance of the light in the FP resonator with the temperature of the FP resonator. Lastly, at step 1008, the method include outputting a temperature measurement based on the temperature of the FP resonator. In some cases, the method includes detecting the resonance of the light in the FP resonator based on a detected maximum or minimum intensity in output light received from the FP resonator.

In some cases where multiple FP resonators are used, as described herein, the above-indicated FP resonator is a first FP resonator, and the method further includes detecting a resonance of a second FP resonator. The second FP resonator is constructed of an inorganic optical material arranged either on the end of the optical fiber or on the first FP resonator. Similar to light coupled into the cavity of the first FP resonator, which resonates at a resonance that varies with the temperature of the first FP resonator, light coupled into a cavity of the second FP resonator resonates at a resonance that varies with temperature of the second FP resonator.

Similar to the step of measuring temperature using the first FP resonator, the method includes determining a temperature of the second FP resonator based on the resonance of the second FP resonator and a relationship that correlates the resonance of the light in the second FP resonator with the temperature of the second FP resonator. The method then outputs a temperature measurement based on at least one of the temperature of the first FP resonator or the temperature of the second FP resonator, e.g., to a local display or memory or communicated to a remote computing device.

In some cases, the methods described herein may further include constructing the FP resonator on the end of the optical fiber, e.g., by depositing two or more layers of material having different refractive indices to form a first reflective surface directly on the end of the optical fiber, depositing material adjacent to the first reflective surface to form the cavity, and depositing two or more layers of material having different refractive indices on the material forming the cavity to form a second reflective surface, wherein the material forming the cavity separates the first reflective surface from the second reflective surface.

In some cases, depositing material adjacent to the first reflective surface to form the cavity includes depositing a channel of material as a waveguide within the material forming the cavity, the channel of material extending in a direction between the first reflective surface and the second reflective surface, and the channel of material having a refractive index that is different than the material in the cavity around the channel of material.

In some cases, the optical fiber is a multicore optical fiber, and the method includes coupling light from at least a first core of the multicore optical fiber into the cavity of the first FP resonator and coupling light from a second core of the multicore optical fiber into the cavity of the second FP resonator, wherein the first FP resonator operates in parallel with the second FP resonator.

It should be understood that aspects of the various embodiments described above can be individually or collectively combined with each other in yet additional combinations to provide further embodiments. Aspects shown and described with respect to any one of the figures may be combined with aspects of other figures and remain within the scope of the disclosure herein.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A temperature measurement device, comprising:
   a Fabry-Pérot resonator constructed of an inorganic optical material on an end of an optical fiber, wherein light in the optical fiber is coupled into a cavity of the Fabry-Pérot resonator and resonates within the Fabry-Pérot resonator at a resonance that varies with temperature of the Fabry-Pérot resonator;
   a detector configured to receive output light from the Fabry-Pérot resonator and produce a signal indicating a detected resonance of the light in the Fabry-Pérot resonator; and
   computing circuitry configured to:
      receive the signal indicating the detected resonance;
      determine the temperature of the Fabry-Pérot resonator based on the detected resonance and a relationship that correlates the detected resonance with the temperature of the Fabry-Pérot resonator; and
      output a temperature measurement based on the temperature of the Fabry-Pérot resonator.

2. The temperature measurement device of claim 1, wherein the cavity of the Fabry-Pérot resonator is between a first reflective surface constructed directly on the end of the optical fiber through which light in the optical fiber is coupled into the cavity and a second reflective surface at an opposite end of the cavity through which the output light is received by the detector.

3. The temperature measurement device of claim 1, wherein the cavity of the Fabry-Pérot resonator is between a first reflective surface at one end of the cavity and a second reflective surface at an opposite end of the cavity, and the cavity includes a channel arranged in a direction between the first reflective surface and the second reflective surface, wherein the channel is comprised of a material having a different refractive index than material in the cavity surrounding the channel.

4. The temperature measurement device of claim 3, wherein a refractive index profile of the material in the channel varies across a width of the channel to form a waveguide in the cavity of the Fabry-Pérot resonator.

5. The temperature measurement device of claim 1, wherein the inorganic optical material of the Fabry-Pérot resonator retains integrity at temperatures above 600° C. such that the temperature measurement device is operable to output a temperature measurement that extends to at least 900° C.

6. The temperature measurement device of claim 1, further comprising an optical circulator arranged along the optical fiber, wherein the optical circulator is configured to direct light emitted from a light source toward the Fabry-Pérot resonator and to direct the output light from the Fabry-Pérot resonator toward the detector.

7. A temperature measurement system, comprising:
   a temperature measurement device according to claim 1, wherein the Fabry-Pérot resonator is a first Fabry-Pérot resonator and the detected resonance of the light in the first Fabry-Pérot resonator is a first detected resonance; and
   a second Fabry-Pérot resonator constructed of an inorganic optical material, wherein output light from the first Fabry-Pérot resonator is coupled into a cavity of the second Fabry-Pérot resonator and resonates within the second Fabry-Pérot resonator at a resonance that varies with temperature of the second Fabry-Pérot resonator,
   wherein the detector is configured to receive output light from the second Fabry-Pérot resonator, and the signal produced by the detector indicates at least one of the first detected resonance of the light in the first Fabry-Perot resonator or a second detected resonance of the light in the second Fabry-Pérot resonator, and
   wherein the computing circuitry is configured to:
      receive the signal indicating the at least one of the first detected resonance or the second detected resonance;
      determine at least one of:
         a first temperature of the first Fabry-Pérot resonator based on the first detected resonance and a first relationship that correlates the first detected resonance with the temperature of the first Fabry-Pérot resonator; or
         a second temperature of the second Fabry-Pérot resonator based on the second detected resonance and a second relationship that correlates the second detected resonance with the second temperature of the second Fabry-Pérot resonator; and
      output a temperature measurement based on at least one of the first temperature of the first Fabry-Pérot resonator or the second temperature of the second Fabry-Pérot resonator.

8. The temperature measurement system of claim 7, wherein the second Fabry-Pérot resonator is arranged in series with the first Fabry-Pérot resonator, and the detector is arranged in series with the second Fabry-Perot resonator to receive the output light from the second Fabry-Pérot resonator which includes at least a portion of the output light from the first Fabry-Pérot resonator.

9. The temperature measurement system of claim 7, wherein the first Fabry-Pérot resonator has a different optical property than the second Fabry-Pérot resonator such that, for a given temperature of the first and second Fabry-Pérot resonators, light in the first Fabry-Pérot resonator resonates at a different resonance than light in the second Fabry-Pérot resonator, and
   wherein the computing circuitry is configured to:
      determine the first temperature of the first Fabry-Pérot resonator and the second temperature of the second Fabry-Pérot resonator; and
      output the temperature measurement based on a combination of the first temperature and the second temperature.

10. The temperature measurement device of claim 7, wherein both the cavity of the first Fabry-Pérot resonator and the cavity of the second Fabry-Pérot resonator include a channel comprised of a material having a different refractive index than material in the cavity surrounding the channel.

11. A temperature measurement system, comprising:
   a temperature measurement device according to claim 1, wherein the Fabry-Pérot resonator is a first Fabry-Pérot resonator and the detected resonance of the light in the first Fabry-Pérot resonator is a first detected resonance; and
   a second Fabry-Pérot resonator constructed of an inorganic optical material on the end of the optical fiber, wherein light in the optical fiber is coupled into the cavity of the first Fabry-Pérot resonator and a cavity of the second Fabry-Pérot resonator, and light in the cavity of the second Fabry-Pérot resonator resonates within the second Fabry-Pérot resonator at a resonance that varies with temperature of the second Fabry-Pérot resonator;

wherein the detector is configured to receive output light from the first Fabry-Pérot resonator and the second Fabry-Pérot resonator, and the signal produced by the detector indicates at least one of the first detected resonance of the light in the first Fabry-Pérot resonator or a second detected resonance of the light in the second Fabry-Pérot resonator, and wherein the computing circuitry is configured to:
receive the signal indicating the at least one of the first detected resonance or the second detected resonance;
determine at least one of:
a first temperature of the first Fabry-Pérot resonator based on the first detected resonance and a first relationship that correlates the first detected resonance with the temperature of the first Fabry-Pérot resonator; or
a second temperature of the second Fabry-Pérot resonator based on the second detected resonance and a second relationship that correlates the second detected resonance with the second temperature of the second Fabry-Pérot resonator; and
output a temperature measurement based on at least one of the first temperature of the first Fabry-Pérot resonator or the second temperature of the second Fabry-Pérot resonator.

12. The temperature measurement system of claim 11, wherein the signal produced by the detector indicates the first detected resonance of the light in the first Fabry-Pérot resonator and the second detected resonance of the light in the second Fabry-Pérot resonator, and
wherein the computing circuitry is configured to:
determine both the first temperature of the first Fabry-Pérot resonator and the second temperature of the second Fabry-Pérot resonator; and
output the temperature measurement based on a combination of the first temperature and the second temperature.

13. The temperature measurement system of claim 11, wherein the optical fiber is a multicore optical fiber comprising at least a first core and a second core, and wherein light in the first core is coupled into the cavity of the first Fabry-Pérot resonator and light in the second core is coupled into the cavity of the second Fabry-Pérot resonator.

14. The temperature measurement system of claim 11, wherein the cavity of the first Fabry-Pérot resonator includes a first channel comprised of a material having a different refractive index than material in the cavity surrounding the first channel;
wherein the cavity of the second Fabry-Pérot resonator includes a second channel comprised of a material having a different refractive index than material in the cavity surrounding the second channel; and
wherein the light in the optical fiber is coupled into both the first channel of the first Fabry-Pérot resonator and the second channel of the second Fabry-Pérot resonator.

15. A temperature measurement system, comprising:
a temperature measurement device according to claim 1, wherein the optical fiber is a first optical fiber, the Fabry-Pérot resonator is a first Fabry-Pérot resonator on the end of the first optical fiber, the detector is a first detector configured to receive the output light from the first Fabry-Pérot resonator, and the signal is a first signal from the first detector indicating a first detected resonance of the light in the first Fabry-Pérot resonator;
a second Fabry-Pérot resonator constructed of an inorganic optical material on an end of a second optical fiber, wherein light in the second optical fiber is coupled into a cavity of the second Fabry-Pérot resonator, and light in the cavity of the second Fabry-Pérot resonator resonates within the second Fabry-Pérot resonator at a resonance that varies with temperature of the second Fabry-Pérot resonator; and
a second detector configured to receive output light from the second Fabry-Pérot resonator and produce a second signal indicating a second detected resonance of the light in the second Fabry-Pérot resonator;
wherein the computing circuitry is configured to:
receive at least one of the first signal indicating the first detected resonance or the second signal indicating the second detected resonance;
determine at least one of:
a first temperature of the first Fabry-Pérot resonator based on the first detected resonance and a first relationship that correlates the first detected resonance with the temperature of the first Fabry-Pérot resonator; or
a second temperature of the second Fabry-Pérot resonator based on the second detected resonance and a second relationship that correlates the second detected resonance with the second temperature of the second Fabry-Pérot resonator; and
output a temperature measurement based on at least one of the first temperature of the first Fabry-Pérot resonator or the second temperature of the second Fabry-Pérot resonator.

16. The temperature measurement system of claim 15, wherein the first Fabry-Pérot resonator has a different optical property than the second Fabry-Pérot resonator such that, for a given temperature of the first and second Fabry-Pérot resonators, light in the first Fabry-Pérot resonator resonates at a different resonance than light in the second Fabry-Pérot resonator.

17. The temperature measurement system of claim 15, further comprising a first optical circulator arranged along the first optical fiber and a second optical circulator arranged along the second optical fiber,
wherein the first optical circulator is configured to direct light in the first optical fiber toward the first Fabry-Pérot resonator and to direct the output light from the first Fabry-Pérot resonator toward the first detector, and
wherein the second optical circulator is configured to direct light in the second optical fiber toward the second Fabry-Pérot resonator and to direct the output light from the second Fabry-Pérot resonator toward the second detector.

18. The temperature measurement system of claim 15, wherein the computing circuitry is configured to:
receive both the first signal indicating the detected resonance of the first Fabry-Pérot resonator and the second signal indicating the detected resonance of the second Fabry-Pérot resonator;
determine both the first temperature of the first Fabry-Pérot resonator and the second temperature of the second Fabry-Pérot resonator; and
output the temperature measurement based on a combination of the first temperature and the second temperature.

19. A method for temperature measurement, comprising:
injecting light into an optical fiber from a light source that emits light over a range of wavelengths or frequencies;
detecting a resonance of light in a Fabry-Pérot resonator constructed of an inorganic optical material on an end of the optical fiber, wherein light in the optical fiber is coupled into a cavity of the Fabry-Pérot resonator and resonates within the Fabry-Pérot resonator at a resonance that varies with temperature of the Fabry-Pérot resonator;
determining the temperature of the Fabry-Pérot resonator based on the resonance of the light in the Fabry-Pérot resonator and a relationship that correlates the resonance of the light in the Fabry-Pérot resonator with the temperature of the Fabry-Pérot resonator; and
outputting a temperature measurement based on the temperature of the Fabry-Pérot resonator.

20. The method of claim 19, wherein the Fabry-Pérot resonator is a first Fabry-Pérot resonator, the method further comprising:
detecting a resonance of a second Fabry-Pérot resonator constructed of an inorganic optical material arranged on either the end of the optical fiber or the first Fabry-Pérot resonator, wherein light coupled into a cavity of the second Fabry-Pérot resonator resonates within the second Fabry-Pérot resonator at a resonance that varies with temperature of the second Fabry-Pérot resonator;
determining the temperature of the second Fabry-Pérot resonator based on the resonance of the second Fabry-Pérot resonator and a relationship that correlates the resonance of the light in the second Fabry-Pérot resonator with the temperature of the second Fabry-Pérot resonator; and
outputting a temperature measurement based on at least one of the temperature of the first Fabry-Pérot resonator or the temperature of the second Fabry-Pérot resonator.

\* \* \* \* \*